United States Patent
Bui et al.

(10) Patent No.: US 7,443,623 B2
(45) Date of Patent: *Oct. 28, 2008

(54) PEAK DETECTION FOR MAGNETIC TAPE TIMING BASED SERVO (75) Inventors: Nhan Xuan Bui, Tucson, AZ (US); Ernest Stewart Gale, Tucson, AZ (US); Eiji Ogura, Yokohama (JP); David Lee Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/048,090

(22) Filed: Mar. 13, 2008

(65) Prior Publication Data

US 2008/0158721 A1 Jul. 3, 2008

Related U.S. Application Data (63) Continuation of application No. 11/286,808, filed on Nov. 22, 2005, now Pat. No. 7,369,342.

(51) Int. Cl.
*G11B 5/09* (2006.01)
*G11B 5/584* (2006.01)
(52) U.S. Cl. ..................... 360/39; 360/77.12
(58) Field of Classification Search .............. None
See application file for complete search history.

(56) References Cited

U.S. PATENT DOCUMENTS

3,959,820 A 5/1976 Braun ..................... 360/77
4,085,427 A 4/1978 Dunn ..................... 360/77
4,689,706 A 8/1987 O'Gwynn ................ 360/14.2
4,745,496 A 5/1988 O'Gwynn ................ 360/77
5,448,430 A 9/1995 Bailey et al. ............ 360/77.12
5,483,394 A 1/1996 Harman .................. 360/77.12
5,581,536 A 12/1996 Klein et al. .............. 369/124
5,689,384 A 11/1997 Albrecht et al. .......... 360/77.12
5,930,065 A 7/1999 Albrecht et al. ........... 360/72.2
5,943,177 A 8/1999 Mathews et al. ............ 360/65
6,100,829 A 8/2000 Fredrickson et al. ....... 341/132
6,239,939 B1 5/2001 Bui et al. ................ 360/77.12
6,366,417 B1 4/2002 Mathews et al. ........... 360/46
6,940,683 B2 9/2005 Berman et al. ........... 360/77.12
2005/0068872 A1 3/2005 Kim et al. ................ 369/53.2
2006/0285237 A1 12/2006 Bayang et al. ............. 360/46

*Primary Examiner*—Andrea Wellington
*Assistant Examiner*—Dan I Davidson
(74) *Attorney, Agent, or Firm*—John H. Holcombe (57) ABSTRACT

Selection of servo signals for peak detection of timing based servo tracks of magnetic tape for lateral positioning of heads relative to the magnetic tape. Servo signals from magneto-resistive servo read head(s) reading a magnetic tape are digitized by analog to digital converter(s); digital peak measurement apparatus is configured to sense the digital converter(s), and provide positive peak values and negative peak values of the digitized servo signals; and control apparatus is configured to determine the greater of the provided positive peak values or negative peak values, and select servo signals having the greater values for a servo channel. Servo apparatus is configured to respond to the selected servo signals to control the lateral positioning of the servo read head(s).

12 Claims, 6 Drawing Sheets

PEAK DETECTION FOR MAGNETIC TAPE TIMING BASED SERVO

CROSS REFERENCE TO RELATED APPLICATION

The present Application is a continuation of parent application Ser. No. 11/286,808, filed Nov. 22, 2005, now U.S. Pat. No. 7,369,342

Commonly assigned U.S. Pat. No. 5,689,384, Albrecht et al., is incorporated for its showing of timing based servo systems for magnetic tape.

FIELD OF THE INVENTION

This invention relates to magnetic tape timing based servo systems, and, more particularly, to detection of timing based servo signals from magnetic tape.

BACKGROUND OF THE INVENTION

Magnetic tape media comprises a medium for storing large amounts of data, and typically comprises a plurality of data tracks that extend longitudinally along the tape. A tape head is employed for reading and/or writing data on the data tracks, and is typically shared between various data tracks or groups of data tracks, and is moved between tracks or groups of tracks in the lateral direction of the tape. The tape head typically comprises a number of separate elements which read and/or write data with respect to a number of parallel data tracks, and is associated with one or more separate servo read heads, which are laterally offset from the read and/or write elements, so as to track follow a servo band and be guided along the data track or tracks. A servo band provides the servo guidance along any of several paths within the band, and the tape head is repositioned laterally within a servo band so that the read and/or write elements access different data tracks. The servo bands are continuous to provide constant track following. Incorporated U.S. Pat. No. 5,689,384 provides timing based servo bands to allow for track following for each of a number of paths across the servo band.

The lateral positioning of the tape head is typically accomplished by actuators, which may have mechanical or electromechanical components. The servo read head is smaller than the lateral width of the servo band, and once the proper lateral positioning of the tape head has been accomplished, as the servo information being sensed by the servo read head indicates, minor adjustments of the head to follow a particular path within the servo band is made by lateral movement of the tape or of the tracks on the tape. Similarly, lateral repositioning of the tape head to different tracks within the same servo band is accomplished by an adjustment of position within the servo band to another path.

The track following is based on the servo signal as read by the servo read head. Timing based servo systems compare the time between peaks to derive the servo read head lateral position. Therefore, the timing based position error signal (PES) is insensitive to speed of the magnetic tape and insensitive to the amplitude of the servo pattern on the magnetic tape. However, noise (tape or electronics) and signal dropout due to media defects can corrupt and cause missed peaks. Additionally, asymmetry (readback distortion), a result of reading with magneto-resistive servo read heads, can in turn reduce peak detection margin, and result in missed peaks.

SUMMARY OF THE INVENTION

Selection of servo signals for peak detection of servo signals derived from timing based servo tracks of magnetic tape. Servo channels of magnetic tape drives, magnetic tape drives, and methods and apparatus sense servo signals from at least one magneto-resistive servo read head and determine the greater of the positive peak values and negative peak values, for selecting the positive or negative servo signals for the servo channel.

In one embodiment, the servo signals are digitized by at least one analog to digital converter, digital peak measurement apparatus is configured to sense the at least one digital converter, and provide positive peak values and negative peak values of the digitized servo signals; and control apparatus is configured to determine the greater of the provided positive peak values and the negative peak values, and to select servo signals having the greater values for a servo channel.

In another embodiment, the control apparatus is configured to select the servo signals having the greater of the provided positive peak values and negative peak values, and servo apparatus is configured to respond to the selected servo signals to control the lateral positioning of the servo read head(s).

In a still further embodiment, the digital peak measurement apparatus is configured to provide the average positive peak values and average negative peak values; and the control apparatus is configured to determine the greater of the provided average positive peak values and the provided average negative peak values, for selecting servo signals.

In a still further embodiment, the control apparatus is configured to determine the greater average peak values in accordance with the equation:

$$\frac{POSpk + NEGpk}{POSpk - NEGpk}.$$

In another embodiment, the control apparatus is configured to determine the greater average peak values by comparing the positive peak values and the negative peak values in accordance with the equation: $(POSpk+NEGpk)<0$.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
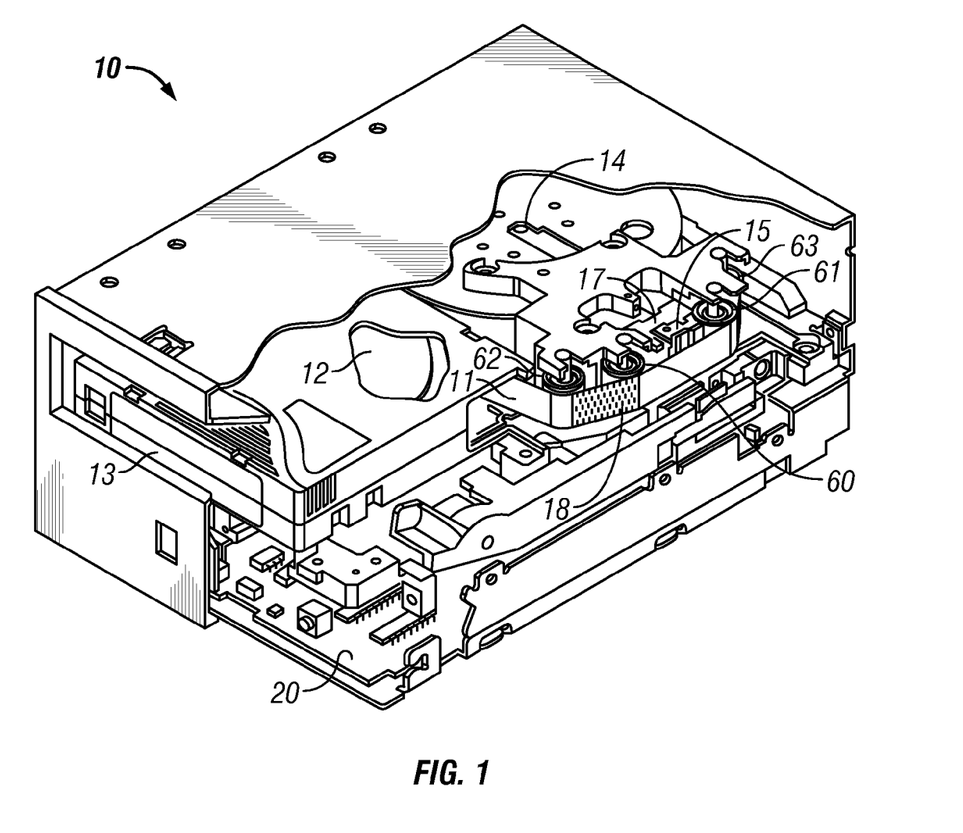
FIG. 1 is a partially cut away view of a data storage device, comprising a magnetic tape drive, implementing the present invention.
Figure 2:
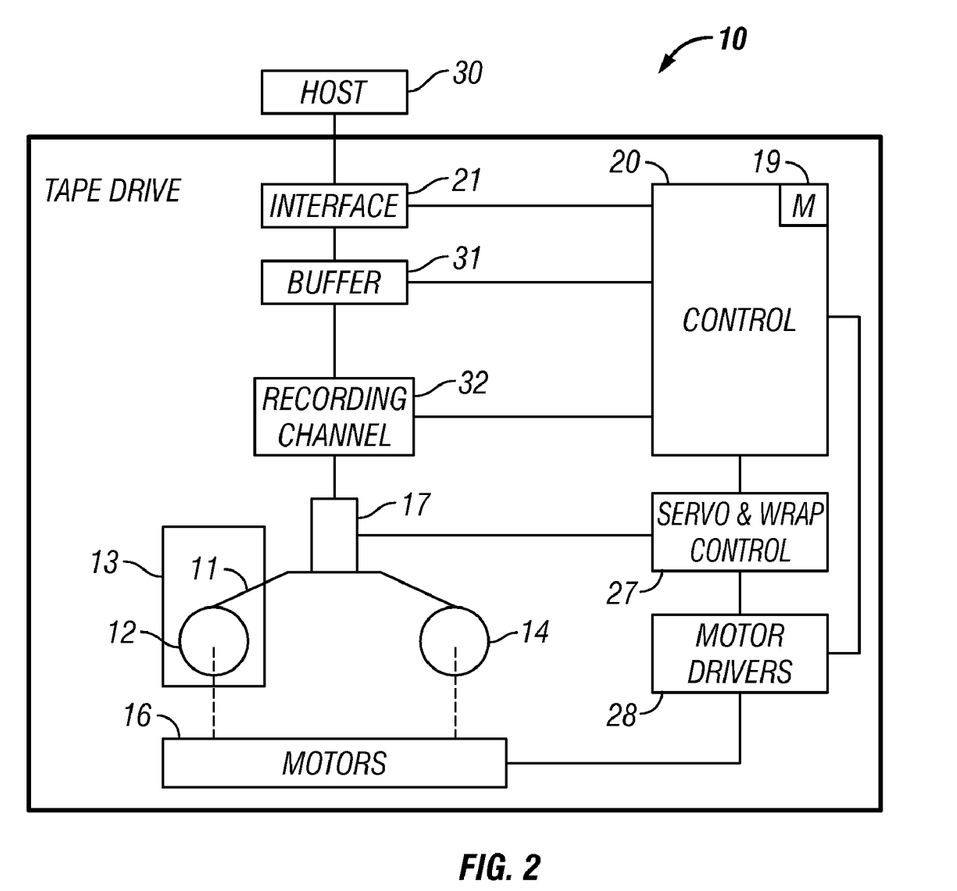
FIG. 2 is a block diagram of the magnetic tape drive of FIG. 1.

FIGS. 1 and 2 illustrate a magnetic tape drive 10 which writes data to and reads data from magnetic tape 11. As is understood by those of skill in the art, magnetic tape drives may take any of various forms. The illustrated magnetic tape drive 10 translates the magnetic tape 11 along a tape path in the longitudinal direction of the tape from a supply reel 12 in a tape cartridge 13 to a take up reel 14, the reels comprising drive reels of a tape drive system which are operated by drive motors 16. A single reel magnetic tape cartridge 13 is illustrated. An example of a magnetic tape drive 10 is the IBM 3592 TotalStorage Enterprise magnetic tape drive. Another example of a magnetic tape drive 10 is the IBM 3580 Ultrium magnetic tape drive. An alternative magnetic tape drive and magnetic tape cartridge is a dual reel cartridge in which both reels 12 and 14 are contained in the cartridge.

The magnetic tape 11 is moved in the longitudinal direction across a tape head 15. The tape head may be supported and laterally moved by an actuator 17 of a track following servo system and wrap control system 27. A set of roller tape guides 60, 61, 62 and 63 hold the tape in position laterally, while motor drivers 28 operate the motors 16 to move the tape longitudinally. The drive motors are operated at various speeds as controlled by the motor drivers 28 to insure that tape leaves one reel at the same speed that it is wound onto the other reel.

The magnetic tape head 15 may comprise a plurality of read and write elements for respectively reading and writing data with respect to the magnetic tape 11, and may have one or more servo sensors for sensing servo tracks or bands 18 recorded on the magnetic tape. The servo sensor(s) may sense the lateral position of the magnetic tape and operate the servo system and actuator 27, 17 to track follow the servo tracks or bands. The servo sensor may also detect the longitudinal position of the tape from the servo tracks or bands. The magnetic tape 11 may have a number of parallel tracks, each of which corresponds to a read and a write element of the magnetic tape head 15. The tracks may be arranged in a back and forth serpentine pattern, each set of tracks called a "wrap", or may be arranged as sets of bands which may be read in both directions. The tape 11 may be moved in a first (or forward) direction from the supply reel 12 to the take up reel 14 while the track following servo follows one wrap or set of tracks, and then the servo and wrap control may operate the actuator 17 to shift the magnetic tape head laterally to another wrap, and the magnetic tape 11 moved in the opposite (or reverse) direction from the take up reel 14 to the supply reel 12 while the track following servo follows the other wrap or set of tracks.

Also as understood by those of skill in the art, a magnetic tape drive 10 comprises one or more controls 20 for operating the magnetic tape drive in accordance with commands received from an external system 30 received at an interface 21. The external system 30 may comprise a network, a host system, a data storage library or automation system, a data storage subsystem, etc., as is known to those of skill in the art.

A control typically comprises logic and/or one or more microprocessors with a memory 19 for storing information and program information for operating the microprocessor(s) and drive. The program information may be supplied to the memory via the interface 21, by an input to the control 20 such as a floppy or optical disk, or by reading from a magnetic tape cartridge, or by any other suitable means. The magnetic tape drive 10 may comprise a standalone unit or comprise a part of a tape library or other subsystem, which may comprise the external system 30.

The control 20 also provides the data flow and formatter for data to be read from and written to the magnetic tape, employing a buffer 31 and a recording channel 32, as is known to those of skill in the art.

Figure 3:
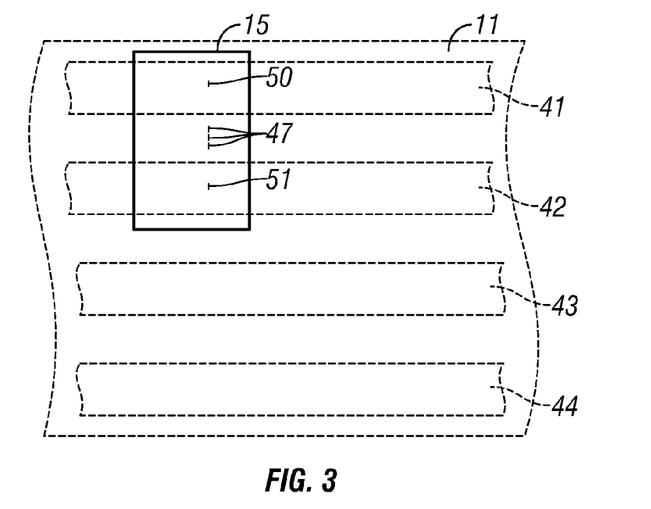
FIG. 3 is a schematic representation of a tape head and a segment of a magnetic tape media with a plurality of separate servo bands in accordance with the present invention.
Figure 4:
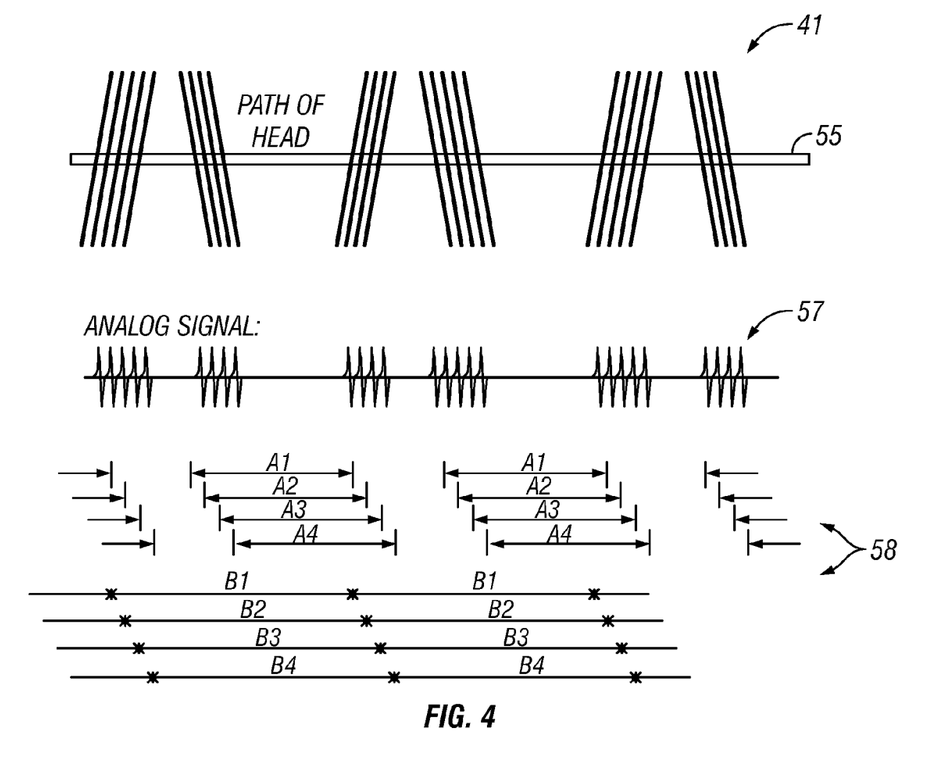
FIG. 4 is a representation of a servo read head as it tracks one of the servo bands of FIG. 3, along with an idealized representation of the servo output signal it generates and the corresponding signal intervals.

FIGS. 3 and 4 illustrate a servo system and the magnetic tape media 11, the magnetic tape media having a plurality of separate longitudinal servo bands 41, 42, 43 and 44, which are laterally positioned on the magnetic tape media. The example of FIG. 3 comprises a magnetic tape media with magnetically written servo bands, and with data tracks positioned between the servo bands. The magnetic tape media is read and/or written by the tape head 15 of the magnetic tape drive. A tape head typically comprises a number of separate elements 47, which read and/or write data with respect to a number of parallel data tracks, and is provided with a separate servo read head, or servo read heads 50, 51, which are offset from the read and/or write elements 47, so as to track follow the servo band and be guided along the data track or tracks.

FIG. 4 illustrates a servo read head path 55 as the servo read head tracks one of the servo bands of FIG. 3, e.g. servo band 41, along with a representation of the generated servo output signal 57 and the corresponding signal intervals 58. The exemplary servo band is of the timing based servo type described in the incorporated U.S. Pat. No. 5,689,384 patent, which comprises patterns of non-parallel laterally extending transitions recorded across the width of the servo band. The timing 58 of the signal 57 derived from reading at any point across the width of such a pattern varies continuously as the servo read head 50, 51 of FIG. 3 is moved laterally across the servo band, since the servo read head 50, 51 is small compared to the width of the servo pattern.

Lateral position sensing is achieved by deriving a ratio of two servo pattern intervals "A" and "B" of FIG. 4 to allow for track following for each of a number of paths across the servo band.

The lateral positioning of the tape head is accomplished by actuator 17, which may have mechanical or electromechanical components. The servo read head is smaller than the lateral width of the servo band, and once the proper lateral positioning of the tape head has been accomplished to the correct path 55, minor adjustments of the head to follow the particular path within the servo band is made by lateral movement of the tape or of the tracks on the tape. Similarly, lateral repositioning of the tape head to different tracks or wraps is accomplished by an adjustment of position within the servo band to another path, or movement to another set of servo bands.

The track following is based on the servo signal as read by the servo read head 50, 51. Timing based servo systems compare the time between peaks of the servo signal to derive the servo read head lateral position. Therefore, the timing based position error signal (PES) is insensitive to speed of the magnetic tape and insensitive to the amplitude of the servo pattern on the magnetic tape. However, noise (tape or electronics) and signal dropout due to media defects can corrupt and cause missed peaks. Additionally, asymmetry (readback distortion), a result of reading with magneto-resistive servo read heads, can in turn reduce peak detection margin, and result in missed peaks.

Figure 5:
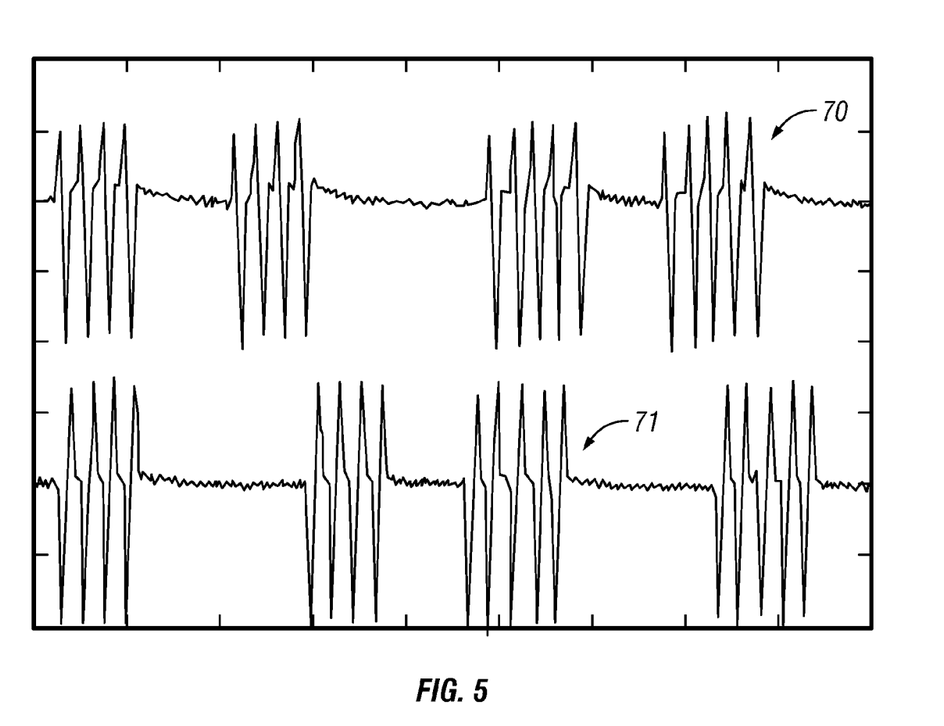
FIG. 5 is an illustration of typical servo signals as read by the servo read head of FIG. 4.

FIG. 5 illustrates two examples of asymmetric servo signals as read by a magneto-resistive servo read head. In the examples, the servo signal 70 is the result of reading in a forward direction of motion of the magnetic tape, and the servo signal 71 is the result of reading in a reverse direction of motion of the magnetic tape. In both, the negative peaks are significantly longer than the positive peaks. In accordance with the present invention, there is improved margin to determine the timing based position error signal (PES) by working on the longest peak.

The peaks are located in time by a peak detector. These are normally thought of as the position where the second derivative is zero AND the peak value is greater (in absolute value) than the threshold. The tracking threshold is a separate circuit of servo control 27 that monitors a percent of the peak to baseline distance. Tracking thresholds are normally implemented as envelope followers (follow max peak values). For example, a 50 percent tracking threshold would keep a level that is half of the peak to baseline distance, and would increase and decrease in order to keep that relationship as the peaks go up and down. Tracking thresholds are normally implemented as dual independent tracking thresholds: one for the positive signal and one for the negative side. Note that in an asymmetric waveform the two values will not be equivalent.

For timing based servo PES detection, only the distance between the positive peaks or the distance between the negative peaks is required, as is known to those of skill in the art. The detector does not have to get both sides.

The stretched peak is better for detection for 2 reasons:
1) the taller peak provides more margin for the threshold qualification (more distance between peak and threshold and more distance between baseline to tracking threshold value).
2) the stretched peak is generally sharper (more pointed) in appearance. This pointedness is good for better time positioning of the exact peak. The pointy peak is more noise tolerant for peak detection than a roundy peak. In a roundy peak, a small noise spike can result in a detected peak in the wrong location. This pointedness results in less peak jitter and therefore a better overall peak position estimate and therefore a better PES.

Another potential source of a symmetry besides the magneto-resistive servo head may comprise the high-pass filtering used to reject low frequency noise sources such as motor and PWM (pulse width modulation) noise, and the media asperities that cause thermal spike noise when they collide with the magneto-resistive element itself. The high-pass filtering along with the relationship between the written servo pattern direction and the readback direction can shift the readback pattern up and down around the baseline. This can have the same effects in reducing peak detection margins as distortion from the magneto-resistive servo head.

Figure 6:
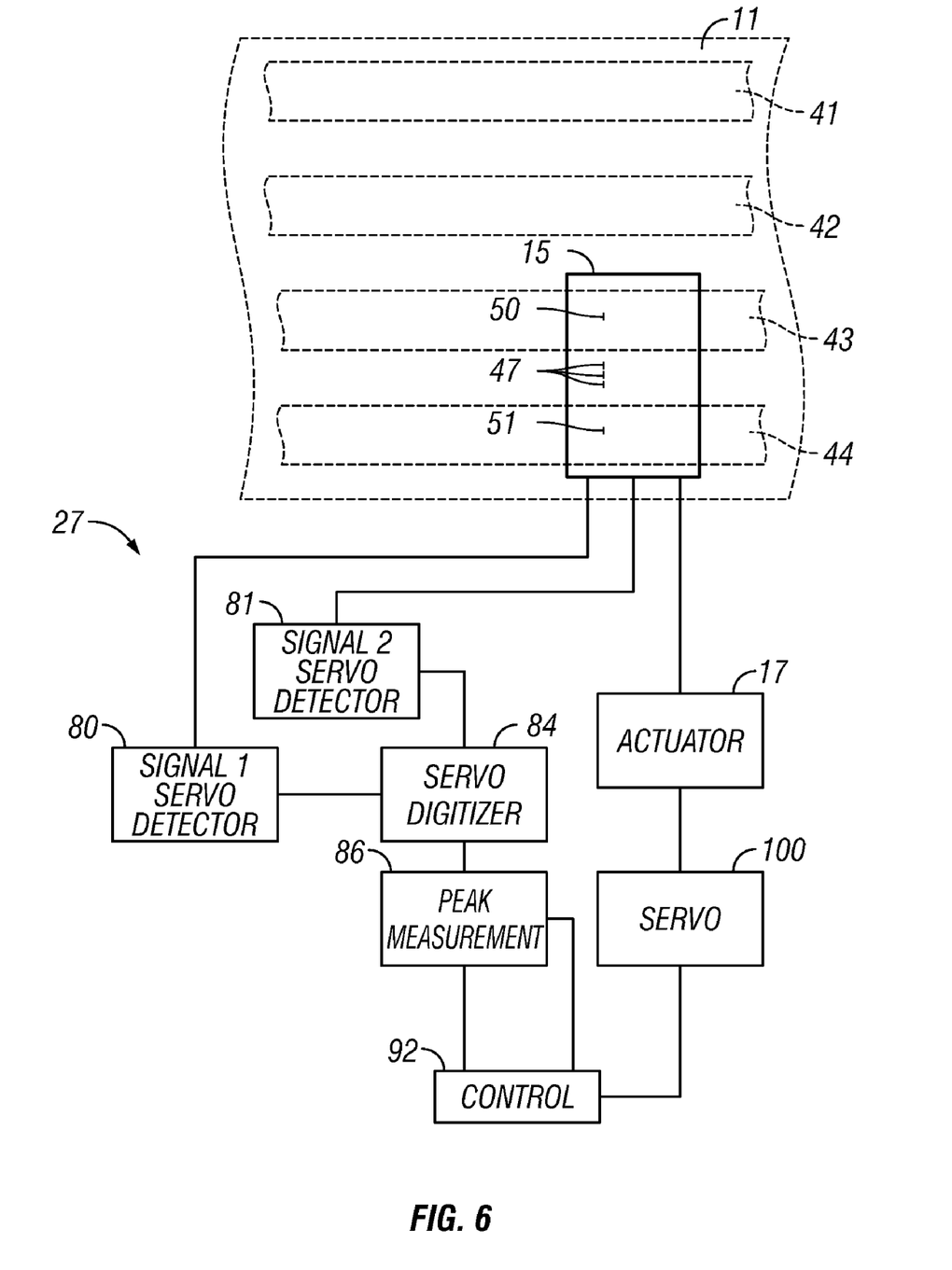
FIG. 6 is a schematic and block representation of servo read heads and a servo reader in accordance with the present invention, for reading servo information of a plurality of separate servo bands on a magnetic tape media.
Figure 7:
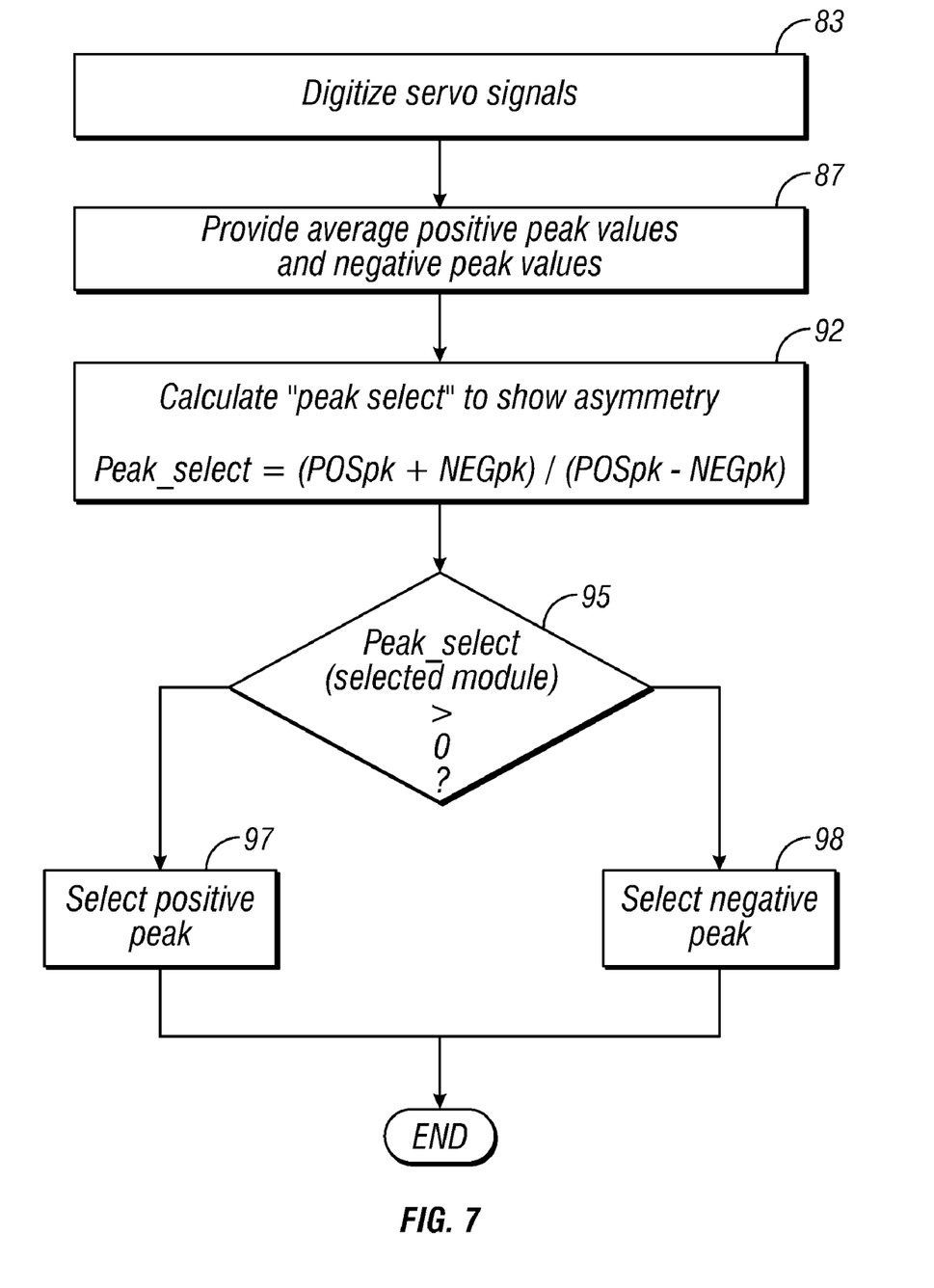
FIG. 7 is a flow chart depicting a method in accordance with an embodiment of the present invention.

Referring to FIGS. 6 and 7, servo signals from at least one magneto-resistive servo read head 50, 51 are provided and measured to determine the greater of the positive peak values and negative peak values, for selecting the positive or negative servo signals for the servo channel.

In one embodiment, the servo signals are detected by servo detectors 80, 81 of servo system 27, and digitized in step 83 by at least one analog to digital converter 84. Digital peak measurement apparatus 86, in step 87, senses the digitized servo signals and provides positive peak values and negative peak values of the digitized servo signals, and may provide the average of positive peak values and the average of negative peak values. The average values may comprise, for example, the average positive peak amplitude of 65,000 positive peaks (a positive number), and the average negative peak amplitude of 65,000 negative peaks (a negative number). In step 90, control apparatus 92 employs a peak detection algorithm, and, in step 95, determines the greater of the provided positive peak values and negative peak values, for selecting servo signals for a servo channel.

In one embodiment, the equation:

$$\frac{POSpk + NEGpk}{POSpk - NEGpk}$$

is employed to determine the greater average peak values in step 95, by determining whether the result is greater or less than 0.

If step 95 determines that the result is greater than 0, in step 97, the control apparatus 92 selects the positive peaks for the servo channel 100. If step 95 determines that the result is less than 0, in step 98, the control apparatus 92 selects the negative peaks for the servo channel 100.

By the above equation, asymmetry is the peak difference normalized by the peak to peak distance. Only one number is thus maintained to indicate which peak to select. Alternatively, the tallest peak may be used directly to make the choice of step 95: if (POSpk+NEGpk)<0, choose the negative peak in step 97, otherwise choose the positive peak. Note: NEGpk is a negative number.

Additionally, as discussed above, a tracking threshold is running, in which there is an independent tracking threshold for the positive and negative side of the waveform. Thus, the above equation may be restated to compare the thresholds, considered equivalent herein: if (POSthr+NEGthr)<0, then choose the negative peak, otherwise choose the positive peak.

The servo channel 100 responds to the selected servo signals to control the lateral positioning of the servo read head(s) 50, 51 through the lateral movement of the tape head 15 by means of the actuator 17, thereby positioning the read and/or write elements 47.

Those of skill in the art will understand that changes may be made with respect to the servo and head arrangements and that other algorithms may be employed to determine the greater peak values. Further, those of skill in the art will understand that differing specific component arrangements may be employed than those illustrated herein, and that various components may be combined.

While the preferred embodiments of the present invention have been illustrated in detail, it should be apparent that modifications and adaptations to those embodiments may occur to one skilled in the art without departing from the scope of the present invention as set forth in the following claims.

The invention claimed is:

1. Apparatus to sense timing based servo signals from at least one magneto-resistive servo read head, said servo signals digitized by at least one analog to digital converter, said apparatus comprising:

digital peak measurement apparatus configured to sense said digitized servo signals, and provide positive peak values and negative peak values of said digitized servo signals; and control apparatus configured to determine the greater of said provided positive peak values and said provided negative peak values, and to select servo signals having said greater values for a servo channel.

2. The apparatus of claim 1, wherein said digital peak measurement apparatus is configured to provide average said positive peak values and average said negative peak values; and said control apparatus is configured to determine the greater of said provided average positive peak values and said provided average negative peak values, for selecting servo signals.

3. The apparatus of claim 1, wherein said control apparatus is configured to determine said greater peak values in accordance with the equation:

$$\frac{POSpk + NEGpk}{POSpk - NEGpk}.$$

4. The apparatus of claim 1, wherein said control apparatus is configured to compare said positive peak values and said negative peak values in accordance with the equation: (POSpk+NEGpk)<0.

5. Servo channel configured to receive timing based servo signals read by at least one magneto-resistive servo read head from a magnetic tape, said servo channel comprising:

at least one analog to digital converter to digitize analog servo signals of said at least one servo read head;

digital peak measurement apparatus configured to sense said digitized servo signals and provide positive peak values and negative peak values of said digitized servo signals; and control apparatus configured to select the servo signals having the greater of said provided positive peak values and said provided negative peak values, and servo apparatus configured to respond to said selected servo signals to control the lateral positioning of said at least one read/write head based on timing of said selected servo signals.

6. The servo channel of claim 5, wherein said digital peak measurement apparatus is configured to provide average said positive peak values and average said negative peak values; and said control apparatus is configured to determine the greater of said provided average positive peak values and said provided average negative peak values, for selecting servo signals.

7. The servo channel of claim 5, wherein said control apparatus is configured to determine said greater peak values in accordance with the equation:

$$\frac{POSpk + NEGpk}{POSpk - NEGpk}.$$

8. The servo channel of claim 5, wherein said control apparatus is configured to compare said positive peak values and said negative peak values in accordance with the equation: (POSpk+NEGpk)<0.

9. A magnetic tape drive comprising:

at least one read/write head for reading and/or writing data from magnetic tape;

at least one magneto-resistive servo read head configured to provide servo signals derived from timing based servo tracks of a magnetic tape, said at least one servo read head associated with said at least one read/write head for lateral positioning of said at least one read/write head;

a magnetic tape drive system configured to move a magnetic tape past said at least one read head and said at least one servo read head;

at least one analog to digital converter to digitize analog servo signals of said at least one servo read head;

digital peak measurement apparatus configured to sense said digitized servo signals, and provide positive peak values and negative peak values of said digitized servo signals;

control apparatus configured to select the servo signals having the greater of said provided positive peak values and said provided negative peak values, and servo apparatus configured to respond to said selected servo signals to control the lateral positioning of said at least one read/write head based on timing of said selected servo signals.

10. The magnetic tape drive of claim 9, wherein said digital peak measurement apparatus is configured to provide average said positive peak values and average said negative peak values; and said control apparatus is configured to determine the greater of said provided average positive peak values and said provided average negative peak values, for selecting servo signals.

11. The magnetic tape drive of claim 9, wherein said control apparatus is configured to determine said greater peak values in accordance with the equation:

$$\frac{POSpk + NEGpk}{POSpk - NEGpk}.$$

12. The magnetic tape drive of claim 9, wherein said control apparatus is configured to compare said positive peak values and said negative peak values in accordance with the equation: (POSpk+NEGpk)<0.

\* \* \* \* \*